United States Patent [19]

Mueller et al.

[11] Patent Number: 4,888,120
[45] Date of Patent: Dec. 19, 1989

[54] WATER-BASED DRILLING AND WELL-SERVICING FLUIDS WITH SWELLABLE, SYNTHETIC LAYER SILICATES

[75] Inventors: Heinz Mueller, Monheim; Claus-Peter Herold, Mettmann; Stephan van Tapavizca, Erkrath; Hans Dolhaine, Duesseldorf; Wolfgang von Rybinski, Duesseldorf; Winfried Wichelhaus, Mettmann, all of Fed. Rep. of Germany

[73] Assignee: Henkel Kommanditgesellschaft auf Aktien, Duesseldorf, Fed. Rep. of Germany

[21] Appl. No.: 94,635

[22] Filed: Sep. 9, 1987

[30] Foreign Application Priority Data

Sep. 18, 1986 [DE] Fed. Rep. of Germany ........ 3631764

[51] Int. Cl.$^4$ ............................................. C09K 3/00
[52] U.S. Cl. .................. 252/8.551; 252/8.51; 252/8.514; 252/8.553; 252/8.554; 523/130; 524/446; 166/275
[58] Field of Search ................ 523/130; 524/446; 252/8.514, 8.551, 8.553, 8.554, 8.51; 166/275

[56] References Cited

U.S. PATENT DOCUMENTS

| | | | |
|---|---|---|---|
| 3,956,140 | 5/1976 | Nahm et al. | 524/446 |
| 4,267,062 | 5/1981 | Byerley | 252/8.55 R |
| 4,351,754 | 9/1982 | Dupré | 524/446 |
| 4,391,925 | 7/1983 | Mintz | 524/446 |
| 4,503,170 | 3/1986 | Drake et al. | 524/446 |
| 4,540,496 | 9/1985 | Peiffer et al. | 252/8.5 |
| 4,595,736 | 6/1986 | Patel | 526/271 |
| 4,600,744 | 7/1986 | Libor et al. | 524/446 |
| 4,613,542 | 9/1986 | Alexander | 524/446 |
| 4,624,982 | 11/1986 | Alexander | 524/446 |
| 4,657,943 | 4/1987 | Wietsma | 524/446 |
| 4,739,003 | 4/1988 | Barr et al. | 524/446 |

FOREIGN PATENT DOCUMENTS 3144770 5/1983 Fed. Rep. of Germany .
3404491 8/1985 Fed. Rep. of Germany .

OTHER PUBLICATIONS

Drilling and Drilling Fluids, Developments in Petroleum Science, 11, G. V. Chilingarian et al. (1983), pp. 226-230.
W. I. Granquist and S. S. Pollack, Natl. Res. Council Publ., "Clays and Clay Minerals", (1960) pp. 150-169.

Primary Examiner—Joseph L. Schofer
Assistant Examiner—J. M. Reddick
Attorney, Agent, or Firm—Ernest G. Szoke; Wayne C. Jaeschke; Henry E. Millson, Jr.

[57] ABSTRACT

Synthetic swellable layer silicates corresponding to the following formula $$MgO.aMA.bAl_2O_3.cSiO_2.nH_2O \qquad (I)$$

in which
M is Na$^+$ and Li$^+$ $^{having\ an\ Na:Li\ ratio\ of\ at\ least\ 1}$;
A is F$^-$, $^{OH-}$ or $\frac{1}{2}$O$^{2-}$ or a mixture thereof;
a is 0.1 to 0.6;
b is 0 to 0.3;
c is 1.2 to 1.7; and
n is 0 to 3.0.

are used in water-based well-servicing fluids as a high-temperature-stable thixotrope substantially unaffected by alkaline earth metal ions.

37 Claims, No Drawings

WATER-BASED DRILLING AND WELL-SERVICING FLUIDS WITH SWELLABLE, SYNTHETIC LAYER SILICATES

BACKGROUND OF THE INVENTION

1. Field of the Art

In the search for new oil and natural gas pools, it is necessary to sink increasingly deeper bores and to drill through increasingly more difficult formations. Accordingly, currently used drilling fluids must satisfy more and more stringent requirements, particularly with respect to temperature and electrolyte stability. In addition, increasing attention is being paid to ecological considerations in the use of such fluids and in their subsequent disposal.

2. Discussion of Related Art

Water-based drilling fluids based on bentonite or bentonite in combination with polysaccharides as thickening auxiliaries are often used today for comparatively shallow wells. Typical polysaccharides used with bentonite include starch, carboxymethyl cellulose (CMC), carboxymethyl hydroxyethyl cellulose (CMHEC), and hydroxyethyl cellulose (HEC); these polysaccharides, however, are only stable to about 120° to 150° C. Accordingly, for working at the relatively high well temperatures associated with deep bores, it is customary today either to use drilling fluids based on mineral oils or to use water-based systems containing special modifying synthetic organic polymers which are more temperature-stable than the prior art polysaccharides. The development of high-stress water-based drilling fluids has resulted in a number of proposed polymers as thermally stable thickeners for these fluids, especially for use with swellable clays, and, more especially, for use with a variety of modified bentonites. Typical polymers for this use are described in the following publications: German patent applications 31 44 770, and 34 04 491; and European patent application Nos. EP 0 122 073 and EP 0 131 124. All these water-based drilling fluid systems have, however, distinct weaknesses at temperatures above 200° C., particularly in the presence of high concentrations of alkaline earth metal ions.

DETAILED DESCRIPTION OF THE INVENTION

The invention provides thixotropic thickening agents for water-based drilling fluids and other water-based well-servicing fluids which are highly stable even at temperatures above 200° C. and which do not exhibit a substantial reduction in viscosity-increasing effect at these temperatures even in the presence of high concentrations of alkaline earth metal ions, as compared to known thixotropic thickening agents. The thickening auxiliaries of the invention are safely mixable with known relatively temperature-stable fluid-modifying synthetic polymers of the type described supra, so that these prior art auxiliaries which are ecologically not entirely safe can be at least partly replaced by an ecologically satisfactory material.

The thixotropic thickening agents of the invention comprise synthetic layer silicates corresponding to formula (I), which are highly water-swellable, viscosity-increasing auxiliaries:

$$MgO.aMA.bAl_2O_3.cSiO_2.nH_2O \quad (I)$$

in which
 M is $Na^+$ and $Li^+$ having an Na:Li ratio of at least 1;
 A is $F^-$, $OH^-$ or $\frac{1}{2}O^{2-}$, or a mixture thereof;
 a is 0.1 to 0.6;
 b is 0 to 0.3;
 c is 1.2 to 1.7; and
 n is 0 to 3.0

The thixotropes are useful for thickening water-based drilling and other well-servicing fluids, are stable at high temperatures, and are substantially unaffected by the concentrations of alkaline earth metal ions normally encountered in well-servicing operations.

Layer silicates corresponding to formula (I) wherein A is other than fluorine are or particular significance as thickening agents in the fluid systems of the invention.

Other than in the operating examples, or where otherwise indicated, all numbers expressing quantities of ingredients or reaction conditions used herein are to be understood as modified in all instances by the term "about".

In terms of structure, the synthetic layer silicates of the formula I are assignable to the class of minerals comprising hectorites and saponites. Natural hectorite is a layer silicate of the smectite group, which, in general, is heavily contaminated with calcium compounds. The most commonly naturally-occurring mineral of this class, bentonite, is a well-known thickening agent for waterbased well-servicing fluid; however, the viscosity-increasing effects of bentonites are very sensitive to high temperatures and to the presence of alkaline earth metal ions. Thus, the more stable sepiolites and attapulgites are now often used instead of bentonite for high-temperature applications in drilling fluids; however, while these mineral auxiliaries exhibit greater thermal stability than bentonite, their thickening effect is very limited in comparison.

Natural hectorite, in addition to many other swellable clays, also has been proposed as a thickener for well-servicing fluids. The particular synthetic hectorites defined in formula (I), however, have not been recognized or described in the prior art for use in well-servicing fluids, and it is entirely unexpected that these layer silicates exhibit such excellent thermal and electrolyte stability, particularly in view of the known thermal and electrolyte sensitivities of bentonite and related minerals of this class. These silicates of formula I are distinguished by a very strong thickening effect, particularly in contrast to sepiolite and attapulgite clays. In water or electrolyte solutions, the swellable layer silicates form clear gels with excellent thickening and thixotropic properties which are not substantially adversely affected by electrolyte loading or temperature stressing, as discussed below. In addition, the swellable silicates of the invention used in conjunction with synthetic polymer auxiliaries of the type described above provide homogeneous and uniform thixotropic thickening systems for use in well-servicing fluids.

The synthetic layer silicates of high swelling power corresponding to general formula (I) are known compounds available as commercial products. Examples of these silicates in commerce are the materials marketed by Deutsche Solvay-Werke GmbH Solingen, Germany under the trademark "Laponite".

The synthesis of layer silicates, including hectorites, has been widely described in the literature: Strese et al, *Z. Anorg. Allg. Chem.* 247 : 65–95, (1941); W.I. Grandquist and S.S. Pollack in "Clays and Clay Minerals" Natl.Acad.Sci., *Natl. Res. Council Publ.* #8, pp. 150–169

(1960); and German patent application No. 1 667 502. Briefly, the synthetic, finely divided water-insoluble layer silicates of the invention are conveniently produced by hydrothermally treating a sodium silicate solution with an oxide, hydroxide, or water-soluble salt (or a mixture thereof) of magnesium, aluminum, and lithium in the molar ratios of the components of the mixed-crystalline layer silicate to be synthesized. The hydrothermal treatment is carried out in the presence of excess alkali, usually sodium hydroxide or sodium bicarbonate. Before the hydrothermal treatment, a premix of the individual components is prepared with vigorous stirring either in a separate mixing vessel or directly in the autoclave to be used for hydrothermal treatment. A finely divided suspension is thus formed, which exhibits an increase in viscosity with increasing solids content. The hydrothermal reaction of the premix is carried out with stirring in the autoclave at 150° to 250° C. and preferably at 170° to 200° C. under an equilibrium vapor pressure corresponding to the reaction temperature. The reaction time is between 1 and 20 hours and preferably between 2 and 8 hours. Reaction temperatures between 170° and 190° C. with reaction times of from 4 to 6 hours are particularly preferred for the hydrothermal reaction.

Although simple aqueous suspensions consisting essentially of the layer silicates of formula (I) are valuable for the purposes of the invention because of their high viscosity at a low, adjustable solids content and, in particular, because of the high-temperature resistance of their viscosity-increasing effects, preferred embodiments of the invention are characterized by the use of thixotropic thickening systems comprising these layer silicates in admixture with standard synthetic or natural polymers for wellservicing fluids of the type described supra which are customarily used to modify these fluids. The well-servicing fluids contemplated include drilling fluids, well-cleaning solutions, carrier fluids for hydraulic crack formations, and annular-space fluids; broadly, any of the polymer auxiliaries commonly used in this technology are useful with the synthetic layer silicates of formula (I). These polymers include natural polymers such as starch, carboxymethyl starch, carboxymethyl cellulose, carboxymethyl hydroxyethyl cellulose, hydroxyethyl cellulose, hydroxyethyl carboxymethyl cellulose, lignin derivatives, lignites and/or chromolignites, alginates, propoxylated alginates, xanthan and other bacterial polysaccharides, as well as synthetic polymers. Synthetic polymers especially developed for use in high-stress fluids are preferably used in one important embodiment of the invention, namely, in drilling fluids and other well-servicing fluids at high temperatures, especially temperatures of at least 175° C., as it is in combination with such fluid-modifying thermally-stable polymers that the greatest advantages of the layer-silicate-based thixotropic agents of the invention are obtained. Suitable high-temperature-resistant fluid-modifying polymers for wellservicing fluids include, for example, synthetic polyvinyl sulfonic acid-based polymers, particularly homopolymers and selected sulfonated vinyl copolymers, especially copolymers of vinyl sulfonic or styrene sulfonic acid with a vinyl acylamide and, if desired, acryl- and/or methacrylamide. Temperature-stable polymers of the type described, for example, in EP No. 0 131 124 and EP No. 0 122 073 and German patent application Nos. 31 44 770 and 34 04 491, incorporated herein by reference, are suitable for use in the invention in conjunction with the layer silicates of formula (I). Combinations of these synthetic polymers with the layer silicates of formula I are useful in drilling fluids and other well-servicing fluids, especially high-stress fluids for use at temperatures of at least 175° C., more especially at temperatures of at least 200° C.

The synthetic polymers are normally used in only limited quantities, as taught by the prior art, for example in quantities of up to about 5% by weight, based on the total quantity of fluid. Even distinctly smaller quantities, for example quantities of up to about 3% by weight, however, also produce valuable effects. The layer silicates of formula (I) are also employed in only limited quantities, which normally do not exceed around 3% by weight, based on the weight of the final aqueous fluid mixture used. Even very small quantities of the layer silicates according to the invention, for example of around 0.1% by weight, produce significant thixotropic effects, so that preferred quantities are typically from about 0.1 to 2.5% by weight, more especially in the range from about 0.5 to 2% by weight, again based on the final water-based well-servicing fluid used.

When used together, the highly swellable layer silicates and synthetic organic polymers are used in virtually any weight ratios, e.g. in ratios of from 2:98 to 98:2. Ratios of these components of from 30:70 to 70:30 parts by weight are particularly suitable.

Combinations of the layer silicates of the invention, especially mixtures with temperature-stable polymers, are particularly suitable for use in low-solids drilling fluids, especially those in which the solids content is no higher than about 10% by weight, and more especially no higher than about 7% by weight, based on the total weight of fluid.

The layer silicates according to the invention are normally used in non-hydrophobicized form. They are also useful together with other solids, including finely divided silica, especially pyrogenic silica or precipitated silica and modified forms thereof, and/or finely divided zeolite compounds, more especialy zeolite NaA.

The layer silicates acording to the invention are easy to use in water-based well-servicing fluids. For example, the layer silicates are readily made up with water into concentrated suspensions containing, for example, from 2 to 2.5% by weight silicate solids with gentle mechanical agitation. After a swelling time of only a few hours, an almost clear gel is obtained, which may be diluted to the desired in-use concentration. If higher fluid viscosities are required in special cases, they are easily obtainable by increasing the concentration of the silicate, typically up to 5%.

The following Examples illustrate the practice of the invention:

EXAMPLES

EXAMPLE 1

Viscosity behavior

The viscosity behavior of a synthetic hectorite according to the invention in both salt solution and tapwater are shown in Table I below in comparison with bentonite. All the measurements were performed at room temperature (25° C). The viscosities are expressed in mPa.s (Brookfield RVT).

TABLE I

| | Viscosities (mPa.s) at hectorite concentrations | | | Viscosities (mPa.s) at bentonite concentrations |
|---|---|---|---|---|
| | 1.0% | 2.0% | 2.5% | 2.5% |
| Tapwater | 30 | 2550 | 2750 | 152 |
| 2.5% NaCl | | | 400 | 50 |
| 2.5% CaCl$_2$ | | | 350 | 43 |
| swelling time for all solutions: 8 hours | | | | |

EXAMPLE 2

Temperature stability

The suitability of a synthetic hectorite according to the invention for applications at high temperatures is demonstrated in Table II below. In this test, a suspension of a layer silicate according to the invention (2.5% by weight solids) in tapwater was heated at various temperatures in a steel autoclave with measurement of viscosity. In every case, the temperature load was applied for 12 hours.

TABLE II

| Temperature | Viscosity (mPa.s) |
|---|---|
| Before temperature stressing (25° C. starting value) | 4950 |
| 200° C. | 5100 |
| 250° C. | 5350 |
| 300° C. | 5500 |
| 350° C. | 5450 |

EXAMPLE 3

Preparation of a synthetic layer silicate of the hectorite type suitable for use in accordance with the invention 394 g magnesium sulfate heptahydrate were dissolved in 4 liters deionized water, followed by the addition with high-shear stirring of a mixture of 273 g of a 50% sodium hydroxide solution and 537 g of a sodium silicate solution containing 27 g SiO$_2$ and 8 g Na$_2$O per 100 g. A finely divided suspension was formed to which 19 g Li$_2$CO$_3$ were added with continued stirring. On completion of the addition, stirring was continued for another 5 minutes.

The suspension was then heated for 20 minutes to 180° C. in a stirrer-equipped autoclave and kept at that temperature for 4 hours. After cooling to 50°-60° C., the autoclave was emptied and the product formed filtered off from the mother liquor. The filter cake was washed free from sulfate with a total of 2.5 liters deionized water and dried at around 120° C. in a recirculating-air drying cabinet.

Analysis of the product gave the following composition (in % by weight):

MgO: 25.3%, Na$_2$O: 5%, Li$_2$O: 1.3%, SiO$_2$: 54.5%, H$_2$O: 12.5%.

EXAMPLE 4

Fluid loss comparison

Aqueous drilling fluid systems based on the one hand on bentonite/CMC and, on the other hand, on a synthetic hectorite according to the invention/CMC were prepared and tested by the standard test in an API filter press.

Three drilling fluids were prepared and compared.

Fluid (a) contained 14 g bentonite and 5 g CMC (carboxymethyl cellulose, unpurified; viscosity of a 5% solution 300 mPa.s) in 350 ml tapwater. Fluid (b) corresponded in its composition to fluid (a), except that 9 g of a synthetic hectorite according to the invention were used instead of the 14 g bentonite. A suspension of 9 g of the same synthetic hectorite according to the invention in 350 ml tapwater was tested as fluid (c). The test results obtained are shown in Table III below.

TABLE III

| Drilling fluid | API fluid loss (ml) |
|---|---|
| a | 3.0 |
| b | 3.0 |
| c | >100 |

The data in Table III show that, although the layer silicate according to the invention does not itself contribute towards reducing fluid loss, it can be adjusted to the desired fluid loss in conjunction with the additives typically used in the prior art. To this end, the hectorite-type layer silicate of the invention is useful in considerably smaller quantities than the bentonite-type layer silicate heretofore generally used.

EXAMPLE 5

Low-solids drilling fluids

The outstanding suitability of synthetic layer silicates according to the invention for the production of low-solids drilling fluids is demonstrated by the following tests. Three drilling fluids A, B and C were prepared and tested for their suitability. Rheological data and fluid losses for these fluids are shown in Table IV below.

The rheological tests were carried out with a Fann 35 viscosimeter of the type normally used for drilling fluids. Before the measurement, the drilling fluid was aged for 24 hours at 175° C. in a Baroid roller oven. The rheological measurements were performed at room temperature. Measurement of the fluid loss was performed in an HTHP filter press at 175° C.

Drilling fluid A (unweighted)
350.00 ml tapwater
3.50 g layer silicate according to Example 3
5.00 g chromolignite
3.00 ml diethanolamine
10.00 g lubricant
1.75 g foam inhibitor
Drilling fluid B (unweighted)
As fluid A, but with lignite instead of chromolignite.
Drilling fluid C (weighted)
As fluid A, but with 265 g barite added.

TABLE IV

| | Drilling Fluid | | |
|---|---|---|---|
| | A | B | C |
| Apparent viscosity (mPa.s) | 9 | 9.5 | 12.5 |
| Plastic viscosity (mPa.s) | 7.5 | 6 | 9 |
| Yield value (lbs/100 ft$^2$) | 2.5 | 7 | 7 |
| Gel strength (lbs/100 ft$^2$) 10" | 2 | 3 | 5 |
| Gel strength (lbs/100 ft$^2$) 10' | 10 | 14 | 8 |
| HTHP fluid loss after 30 mins. (ml) | 3.6 | 3.5 | 4 |

EXAMPLE 6

Viscosity Behavior

This Example demonstrates the viscosity behavior of synthetic hectorite according to the invention by comparison with natural hectorite both in distilled water and in tapwater.

TABLE V

| Comparison between natural and synthetic hectorite | |
|---|---|
| Product | Brookfield viscosity, spindle 2 (20 r.p.m.) |
| 2.5% by weight natural hectorite in distilled water | 10 mPa.s |
| 2.5% by weight natural hectorite in tapwater | 160 mPa.s |
| 2.5% by weight synthetic hectorite in distilled water | >600 mPa.s |
| 2.5% by weight synthetic hectorite in tapwater | 15,000 mPa.s |

The comparison shows that considerably higher viscosity values are obtained with the synthetic hectorite according to the invention.

EXAMPLE 7

Viscosity and fluid loss

Drilling fluids of the following composition were compared with one another:
350 ml of a 1.25% by weight aqueous layer silicate solution
90 g NaCl
10 g Hostadrill TM
150 g barite (barium sulfate)

Hostadrill TM is Polymer Hoe E 2825 (Hoechst AG, Frankfurt), a copolymer of vinylsulfonic acid and N-vinylcarboxylic acid amides.

The following products were used as layer silicates:
(a) synthetic hectorite according to Example 3.
(b) natural hectorite.
(c) bentonite.
(d) blank test (water only was used instead of the layer silicate solution).

The measured values are shown in Table VI below, in which API fluid loss is the water loss in the API filter press test according to Example 4:

The fluids (b), (c), and (d) exhibit considerably lower viscosities than fluid (a) containing the synthetic layer silicate according to the invention. Fluid (a) exhibits the lowest fluid loss which increases only very slightly on aging.

With natural hectorite (fluid b), lower viscosities are obtained and the fluid loss is very high.

Fluids (b), (c), and (d) all exhibit substantially complete barite sedimentation after aging in the roller oven. This is to be expected from the rheological data (no yield value).

TABLE VI

| | Comparison of drilling fluids | | | |
|---|---|---|---|---|
| | a | b | c | d |
| Apparent viscosity (mPa.s) | 52 | 24 | 15 | 14 |
| Plastic viscosity (mPa.s) | 41 | 28 | 15.5 | 15 |
| Yield value (lbs/100 ft²) | 31 | — | — | — |
| API fluid loss (30 mins) (ml) | 1.5 | 15 | 3 | 80 |
| API fluid loss (30 mins) after aging for 16 hours at 177° C. (ml) | 3 | 25 | 8 | 12 |
| Evaluation | no barite sedimentation | complete barite sedimentation | complete barite sedimentation | complete barite sedimentation |

EXAMPLE 8

Rheological behavior

The rheological behavior of a 1.2% solution of the hectorite of Example 3 was measured over a temperature range of from 30 to 200° C. in a high-pressure/high-temperature viscosimeter. The hectorite solution was adjusted to pH 11 by addition of alkali metal hydroxide. The results are shown in Table VII.

TABLE VIII

| Rheological data of synthetic hectorite solution at 30 to 200° C. | | | | |
|---|---|---|---|---|
| | pH 11 (adjusted with NaOH) | | pH 11 (adjusted with LiOH) | |
| Measurement temperature | plastic viscosity (mPa.s) | Bingham yield value (dPa) | plastic viscosity (mPa.s) | Bingham yield value (dPa) |
| 30 | 5 | 12 | 6 | 11 |
| 50 | 4 | 11 | 5 | 17 |
| 80 | 4 | 15 | 4 | 19 |
| 100 | 4 | 15 | 3 | 16 |
| 150 | 2 | 12 | 2 | 15 |
| 200 | 2 | 10 | 2 | 11 |

The measured data show the high temperature stability of synthetic hectorite according to the invention. The plastic viscosity decreases only slowly with increasing temperature. The yield value is relatively constant over the entire temperature range. Accordingly, the hectorite is eminently suitable for use in drilling fluids and other well-servicing fluids.

We claim:

1. In a water-based well-servicing fluid that includes a swellable clay for increasing the viscosity of the fluid, the improvement comprising employing as the swellable clay a hightemperature- and electrolyte-stable synthetic hectorite thixotrope of the formula:

$$MgO.aMA.bAl_2O_3.cSiO_2.nH_2O \qquad (I)$$

in which
M is Na+ and Li+ having an Na:Li ratio of at least 1;
A is F−, OH− or ½O²− or a mixture thereof;
a is 0.1 to 0.6;
b is 0 to 0.3;
c is 1.2 to 1.7; and
n is 0 to 3.0.

2. The well-servicing fluid of claim 1, further including a hightemperature-stable synthetic polymer.

3. The well-servicing fluid of claim 1, wherein the hectorite is present in an amount of up to about 3% by weight, based on the weight of the fluid.

4. The well-servicing fluid of claim 3, wherein the hectorite is present in an amount of from about 0.1 to 2.5% by weight.

5. The well-servicing fluid of claim 3, wherein the hectorite is present in an amount of from about 0.3 to 2% by weight.

6. The well-servicing fluid of claim 2, wherein the synthetic polymer is a water-soluble polyvinyl sulfonic acid homopolymer or copolymer.

7. The well-servicing fluid of claim 2, wherein the synthetic polymer is a copolymer of vinyl sulfonic acid and vinyl acylamide, a copolymer of styrene sulfonic acid and vinyl acylamide, a homopolymer of vinyl sulfonic acid, a homopolymer of styrene sulfonic acid, or each of the copolymers or homopolymers with (meth)acrylamide.

8. The well-servicing fluid of claim 1, wherein the hectorite is substantially fluorine-free.

9. The well-servicing fluid of claim 1, wherein the hectorite is non-hydrophobicized.

10. The well-servicing fluid of claim 2, wherein the synthetic polymer is present in an amount up to about 5% by weight, based on the weight of the fluid.

11. The well-servicing fluid of claim 10, wherein the ratio of hectorite and synthetic polymer is from about 2:98 to 98:2 parts by weight.

12. The well-servicing fluid of claim 11, wherein the ratio of hectorite to synthetic polymer is from about 30:70 to 70:30 parts by weight.

13. The well-servicing fluid of claim 2, further including finelydivided silica, or finely divided crystalline zeolite, or both.

14. The well-servicing fluid of claim 13, wherein the silica is pyrogenic silica or precipitated silica, or a modified form thereof and the zeolite is zeolite NaA.

15. The well-servicing fluid of claim 1, wherein the fluid is a drilling fluid.

16. The well-servicing fluid of claim 15, wherein the fluid is a low-solids fluid having a solids content of no more than about 10% by weight, based on the weight of the fluid.

17. The well-servicing fluid of claim 15, wherein the fluid is a low-solids fluid having a solids content of no more than about 7% by weight, based on the weight of the fluid.

18. The well-servicing fluid of claim 1, wherein the synthetic hectorite is substantially stable at a temperature above about 175° C.

19. The well-servicing fluid of claim 1, wherein the synthetic hectorite is substantially stable at a temperature above about 200° C.

20. A method for increasing the viscosity of a water-based well-servicing fluid comprising incorporating into the fluid a high-temperature- and electrolyte-stable synthetic hectorite thixotrope of the formula:

$$MgO.aMA.bAl_2O_3.cSiO_2.nH_2O \qquad (I)$$

in which
  M is Na+ and Li+ having an Na:Li ratio of at least 1;
  A is F−, OH− or ½O²− or a mixture thereof;
  a is 0.1 to 0.6;
  b is 0 to 0.3;
  c is 1.2 to 1.7; and
  n is 0 to 3.0.

21. The method of claim 20, wherein a synthetic polymer is incorporated into the fluid along with the hectorite.

22. The method of claim 20, wherein the hectorite is present in an amount of up to about 3% by weight, based on the weight of the fluid.

23. The method of claim 22, wherein the hectorite is present in an amount of from about 0.1 to 2.5% by weight.

24. The method of claim 23, wherein the hectorite is present in an amount of from about 0.3 to 2% by weight.

25. The method of claim 21, wherein the synthetic polymer is a watersoluble polyvinyl sulfonic acid homopolymer or copolymer.

26. The method of claim 21, wherein the synthetic polymer is a copolymer of vinyl sulfonic acid and vinyl acylamide, a copolymer of styrene sulfonic acid and vinyl acylamide, a homopolymer of vinyl sulfonic acid, a homopolymer of styrene sulfonic acid, or each of the copolymers or homopolymers with (meth)acrylamide.

27. The method of claim 21, wherein the synthetic polymer is present in an amount up to about 5% by weight, based on the weight of the fluid.

28. The method of claim 27, wherein the ratio of hectorite and synthetic polymer is from about 2:98 to 98:2 parts by weight.

29. The method of claim 28, wherein the ratio of hectorite to synthetic polymer is from about 30:70 to 70:30 parts by weight.

30. The method of claim 20, wherein the fluid is a drilling fluid.

31. The method of claim 30, wherein the fluid is a low-solids fluid having a solids content of no more than about 10% by weight, based on the weight of the fluid.

32. The method of claim 31, wherein the fluid is a low-solids fluid having a solids content of no more than about 7% by weight, based on the weight of the fluid.

33. The method of claim 20, wherein the synthetic hectorite is substantially stable at a temperature above about 175° C.

34. The method of claim 33, wherein the synthetic hectorite is substantially stable at a temperature above about 200° C.

35. In a water-based well-servicing fluid that includes a thickening system for the fluid including a swellable clay and a naturally-occurring or synthetic polymer, the improvement comprising employing as the swellable clay a high-temperature- and electrolyte-stable synthetic hectorite thixotrope of the formula:

$$MgO.aMA.bAl_2O_3.cSiO_2.nH_2O \qquad (I)$$

in which
  M is Na+ and Li+ having an Na:Li ratio of at least 1;
  A is F−, OH− or ½O²− or a mixture thereof;
  a is 0.1 to 0.6;
  b is 0 to 0.3;
  c is 1.2 to 1.7; and
  n is 0 to 3.0.

36. The well-servicing fluid of claim 35, wherein the polymer is a polysaccharide.

37. The well-servicing fluid of claim 35, wherein the polymer is a synthetic polymer.

* * * * *